No. 683,633. Patented Oct. 1, 1901.
M. J. ALTHOUSE.
JOURNAL BEARING OR BOX.
(Application filed Mar. 25, 1901.)
(No Model.)
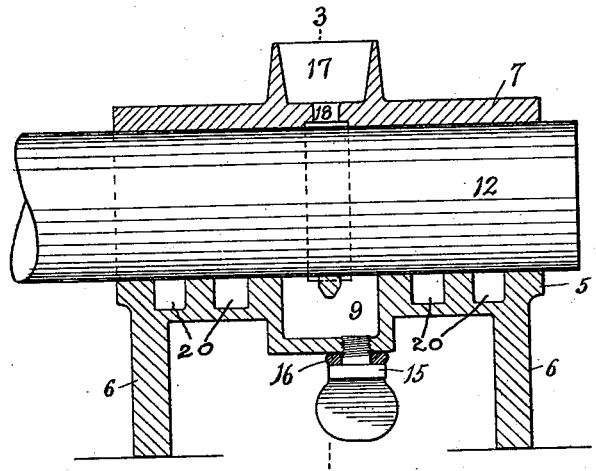
Fig. 1.
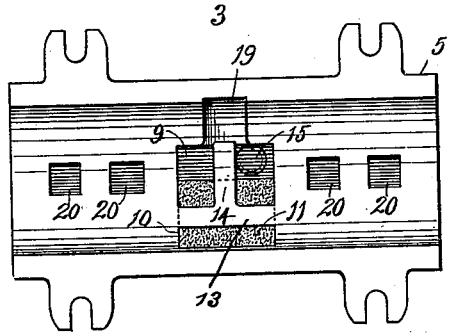
Fig. 2.
Fig. 3.
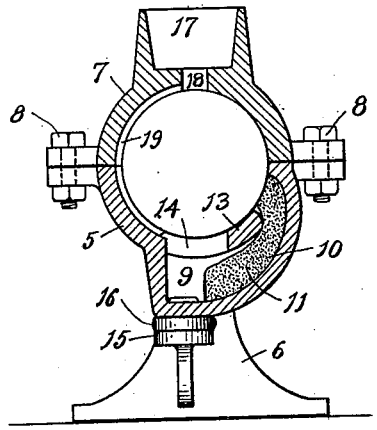
Fig. 4.
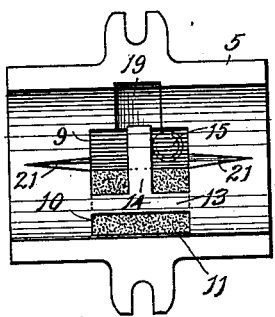
Witnesses:
D. H. Keeney
Anna C. Faust
Inventor:
Milo J. Althouse
By Benedict Morsell
Attorneys.

UNITED STATES PATENT OFFICE.

MILO J. ALTHOUSE, OF WAUPUN, WISCONSIN.

JOURNAL BEARING OR BOX.

SPECIFICATION forming part of Letters Patent No. 683,633, dated October 1, 1901.

Application filed March 25, 1901. Serial No. 52,744. (No model.)

*To all whom it may concern:*

Be it known that I, MILO J. ALTHOUSE, residing at Waupun, in the county of Fond du Lac and State of Wisconsin, have invented a new and useful Improvement in Journal Bearings or Boxes, of which the following is a description, reference being had to the accompanying drawings, which are a part of this specification.

My invention relates to improvements in journal bearings or boxes for revolving shafts, and is chiefly directed to the construction of the box whereby improved methods of lubricating the bearing of the shaft are secured.

The invention consists of the improved journal bearing or box and its parts and combinations of parts, as herein described and claimed, or the equivalents thereof.

In the drawings, Figure 1 is a vertical longitudinal section of my improved journal bearing or box, a fragment of a shaft being shown therewith to illustrate the relation of a shaft to the box. Fig. 2 is a top plan view of the lower half or bottom portion of my improved box. Fig. 3 is a transverse section of the improved box on line 3 3 of Fig. 1. Fig. 4 is a top plan view of the lower half of a modified form of box containing my improvement.

My improved box is preferably constructed of chilled iron or chilled steel, at least so far as the bearing-surface of the box is concerned, and especially the lower half or chief bearing portion of the box.

My improved box is preferably made in two members. The lower half or box-bearing member 5 may be provided with legs 6 6 or any other suitable and equivalent means of supporting it. The upper or cap member 7 is complementary to the bearing member 5, each member being provided with a semicircular bearing-surface opposite and registering with each other, so as to provide the necessary circular bearing for the shaft. The two members 5 and 7 are secured together releasably by bolts 8 8 through lugs therefor on the two members of the box. The bearing member 5 is provided centrally in its lower portion with a receptacle 9, adapted for holding oil or other fluid or semifluid lubricating material. This receptacle is formed with an open top or mouth in the bearing-surface of the box, preferably as extensive in area as the greatest lateral area of the receptacle, so that the fluid lubricating material in the receptacle will across a wide surface contact directly with the journal or shaft in the box. Means hereinafter described provides for keeping the receptacle constantly full of material by automatic self-feed. This receptacle is provided with a lateral passage 10, leading from the receptacle 9 laterally and upwardly in the side of the bearing member 5 to a port or mouth in the shaft-bearing surface of the member a little way up the side of the bearing-surface of the box. This passage 10 is advisably provided with absorbing material (preferably felt) 11, the lower edge of which extends into the receptacle 9 and the upper edge of which comes to the bearing-surface of the box and projects a little therefrom, so as to bear against the surface of the axle 12 therein. This absorbing material 11 and the passage 10 are advisably as wide as the length of the receptacle 9 in the direction of the length of the shaft.

That portion of the member 5 that is over the passage 10 and between the top of the receptacle 9 and the mouth of the passage 10 forms a bridge 13, that serves as a bearing at this locality for the shaft and at the same time as a wall to the passage 10. I also advisably provide a lateral bridge 14, extending from the bridge 13 across the receptacle 9 medially to the opposite side of the receptacle, where it merges into the member 5. The bridges 13 and 14 are integral with the member 5. The absorbing material 11 serves by capillary attraction to carry the lubricating material in which its lower end is immersed up to the shaft, at the side thereof, whereby the shaft is lubricated at a locality above and at one side of the receptacle in the bottom of the box, thus providing for lubricating the shaft even when the supply of lubricating material has become low in the receptacle and independently of any lubrication of the shaft directly from the receptacle. I also provide an aperture in the bottom of the receptacle 9, which is closed by a screw-threaded plug 15, advisably provided with a wing or thumb-piece. Also advisably a packing 16 is interposed between the outer surface of the box member 5 and a shoulder on the plug 15, whereby the closure of the aperture into the receptacle is made sure and effective. By means of this construction the receptacle can be emptied of absorbing material and cleaned whenever it is desirable to do so.

The cap member 7 is provided with a cup 17 in its top, from which a passage 18 leads from its bottom directly to the shaft-aperture in the member, and a passage 19 is provided leading from the passage 18 in the bearing-surface of the members 7 and 5 around and down to the receptacle 9, whereby any fluid lubricating material may be poured into the cup 17, and therefrom it will flow down onto the shaft 12 and around through the passage 19 to the receptacle 9. I also preferably provide one or more pockets 20 in the member 5 at the bottom in the bearing-surface, which are adapted to receive therein the excess or supply of lubricating material that has spread out on the surface of the shaft and on the surface of the bearing member 5, which would otherwise likely escape at the ends of the bearing member and be wasted. These pockets are located in the bearing member medially between the ends thereof and the receptacle 9 and are liable to be filled with lubricating material deposited therein in the manner stated, and thus become a means for lubricating those portions of the shaft in the bearing that are more or less distant from the receptacle 9 and the absorbing material 11.

In the modified form of construction shown in Fig. 4 I provide elongated pockets 21, extending in the direction of the axis of the shaft from the receptacle 9 in the bearing-surface of the member 5 and advisably at the bottom thereof, which pockets 21 are thereby adapted to receive the excess of lubricating material therein and conduct it back into the receptacle 9.

It should be added that the absorbing material 11, which by its capillary effort carries fluid lubricated up to the shaft at the side, is not absolutely necessary in this box, because when the receptacle is full of lubricating material that material will adhere to the shaft directly and otherwise the rotation of the shaft produces a suction that draws the material up against the shaft.

What I claim as my invention is—

1. A journal bearing or box, comprising two complementary members each having a substantially semicircular bearing-surface, the lower member having a receptacle for lubricating material medially thereof in its bearing-surface at the bottom and a laterally-extending passage from the receptacle opening at the side of the bearing-surface, and the upper member having a cup and a passage from the bottom of the cup to the bearing-surface and thence around in the bearing-surfaces of the two members down to the receptacle for lubricating material.

2. In a journal bearing or box, a bearing member having a curved bearing-surface and provided with a receptacle for lubricating material in its bearing-surface at the bottom medially and a passage leading from the receptacle laterally and upwardly to the upwardly-extending side of the bearing-surface, a bridge over said passage longitudinally of the bearing and forming a portion of the bearing-surface and a transverse bridge from said first-mentioned bridge over the receptacle and also forming a part of the bearing-surface.

3. In a journal bearing or box, a bearing member having a curved bearing-surface and provided with a receptacle for lubricating material in its bearing-surface at the bottom medially and with a passage leading from the receptacle laterally and upwardly to the upwardly-extending side of the bearing-surface and a plug closing a discharging-aperture in the bottom of said receptacle.

4. In a journal bearing or box, a bearing member having a curved bearing-surface and provided with a receptacle for lubricating material in its bearing-surface at the bottom medially, and one or more pockets in the bearing-surface at the bottom adapted to catch the excess of lubricating material.

In testimony whereof I affix my signature in presence of two witnesses.

MILO J. ALTHOUSE.

Witnesses:
J. E. BRINKERHOFF,
S. D. HINKLEY.